(12) United States Patent
Feng et al.

(10) Patent No.: US 11,933,330 B2
(45) Date of Patent: Mar. 19, 2024

(54) PNEUMATIC HYDRAULIC RETRACTABLE DEVICE

(71) Applicant: J.D COMPONENTS CO., LTD., Chang Hua Hsien (TW)

(72) Inventors: Pin-Chieh Feng, Chang Hua Hsien (TW); Nien-Teng Kuo, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 0 days.

(21) Appl. No.: 18/335,490

(22) Filed: Jun. 15, 2023

(65) Prior Publication Data

US 2023/0407889 A1    Dec. 21, 2023

(30) Foreign Application Priority Data

Jun. 15, 2022   (TW) .................................. 111206311

(51) Int. Cl.
*F15B 15/16*      (2006.01)
*F15B 13/02*      (2006.01)

(52) U.S. Cl.
CPC ............ *F15B 15/16* (2013.01); *F15B 13/024* (2013.01)

(58) Field of Classification Search
CPC ............................... F15B 13/024; F15B 15/16
USPC .......................................................... 60/480
See application file for complete search history.

(56) References Cited

U.S. PATENT DOCUMENTS

| 2012/0049427 A1* | 3/2012 | Hsu .......................... F16F 9/063 188/313 |
| 2019/0203798 A1* | 7/2019 | Cox .......................... F16F 9/18 |

FOREIGN PATENT DOCUMENTS

TW               M619009 U     11/2021

* cited by examiner

*Primary Examiner* — Michael Leslie
*Assistant Examiner* — Daniel S Collins
(74) *Attorney, Agent, or Firm* — Muncy, Geissler, Olds & Lowe, P.C.

(57) ABSTRACT

A pneumatic hydraulic retractable device includes a fluid pressure cylinder having a cylinder body and a plug seat disposed in the cylinder body, a piston rod movably disposed in the fluid pressure cylinder, a control valve set having a valve seat disposed at the piston rod and forms an upper fluid chamber and a lower fluid chamber with the cylinder body therebetween, and a valve rod disposed in the valve seat for controlling communication between the upper and lower fluid chambers, and a pressure relief element forming a pressure relief gap with the piston rod. The pressure relief gap communicates with the lower fluid chamber through a communication portion of the pressure relief element. As such, when the valve rod is opened, the fluid is allowed to flow between the lower fluid chamber and the pressure relief gap through the communication portion for reducing airtight effect.

7 Claims, 9 Drawing Sheets

PNEUMATIC HYDRAULIC RETRACTABLE DEVICE

BACKGROUND OF THE INVENTION

1. Field of the Invention

The present invention relates to retractable devices and more particularly, to a pneumatic hydraulic retractable device.

2. Description of the Related Art

A pneumatic height adjustment structure disclosed by TW M619009 uses a control set to push a shaft upwards for driving a valve door to move upwards. This allows the first air chamber and the second air chamber to communicate with each other. Under pressure of saddle, the lifting tube is lowered to adjust height of the saddle. If the lifting tube is not pressured, the lifting tube is driven by the air flowing from the second air chamber to the first air chamber to rise, thereby adjusting height of the saddle.

However, in the aforesaid prior art, the airtight effect is generated between the piston valve and the shock-absorbing element so as to cause greater resistance therebetween. As a result, the rider needs to apply more force to push the saddle down, such that it is very inconvenient for the rider to operate. In addition, the airtight effect will counteract the shock-absorbing effect produced by the air, and therefore the proper shock-absorbing effect cannot be exerted.

SUMMARY OF THE INVENTION

It is a primary objective of the present invention to provide a pneumatic hydraulic retractable device, which can effectively reduce airtight effect.

To attain the above objective, the pneumatic hydraulic retractable device of the present invention comprises a fluid pressure cylinder, a piston rod, a control valve set, and a pressure relief element. The fluid pressure cylinder has a cylinder body and a plug seat disposed in the cylinder body and located at one end of the cylinder body. The piston rod is movably disposed in the fluid pressure cylinder. The control valve set includes a valve seat disposed at one end of the piston rod and forms an upper fluid chamber and a lower fluid chamber with the cylinder body therebetween, and a valve rod disposed in the valve seat and moved between a close position where the upper and lower fluid chambers do not communicate with each other and an open position where the upper and lower fluid chambers communicate with each other. The pressure relief element is disposed between the valve seat and the plug seat and penetrated by the piston rod. The pressure relief element has a communication portion, and one end of the pressure relief element and the piston rod forms a pressure relief gap therebetween. The pressure relief gap communicates with the lower fluid chamber through the communication portion.

It can be seen from the above that when the valve rod is opened, the fluid is allowed by the communication portion to flow between the lower fluid chamber and the pressure relief gap for reducing airtight effect.

Preferably, the pressure relief element extends integrally from one end of the valve seat towards the plug seat.

Preferably, one end of the pressure relief element has an annular groove. A diameter of the annular groove is greater than a diameter of the piston rod so as to form the pressure relief gap between the annular groove and the piston rod.

Preferably, the pressure relief element has one end supporting one end of the valve seat and the other end abutted against the plug seat.

Preferably, an inner surface of the pressure relief element has a recess forming the pressure relief gap with the piston rod.

Preferably, the communication portion can be a plurality of notches arranged in an equally-spaced annular manner or a plurality of through holes arranged in an equally-spaced annular manner.

Other advantages and features of the present invention will be fully understood by reference to the following specification in conjunction with the accompanying drawings, in which like reference signs denote like components of structure.

DETAILED DESCRIPTION OF THE INVENTION

First of all, it is to be mentioned that the technical features provided by the present invention are unlimited to the specific structure, usage and application thereof described in the detailed description of the invention. It should be understood by those skilled in the related art that all the terms used in the contents of the specification are for illustrative description. The directional terms mentioned in the contents of the specification are also just for illustrative description on the basis of normal usage direction, not intended to limit the claimed scope.

Figure 1:
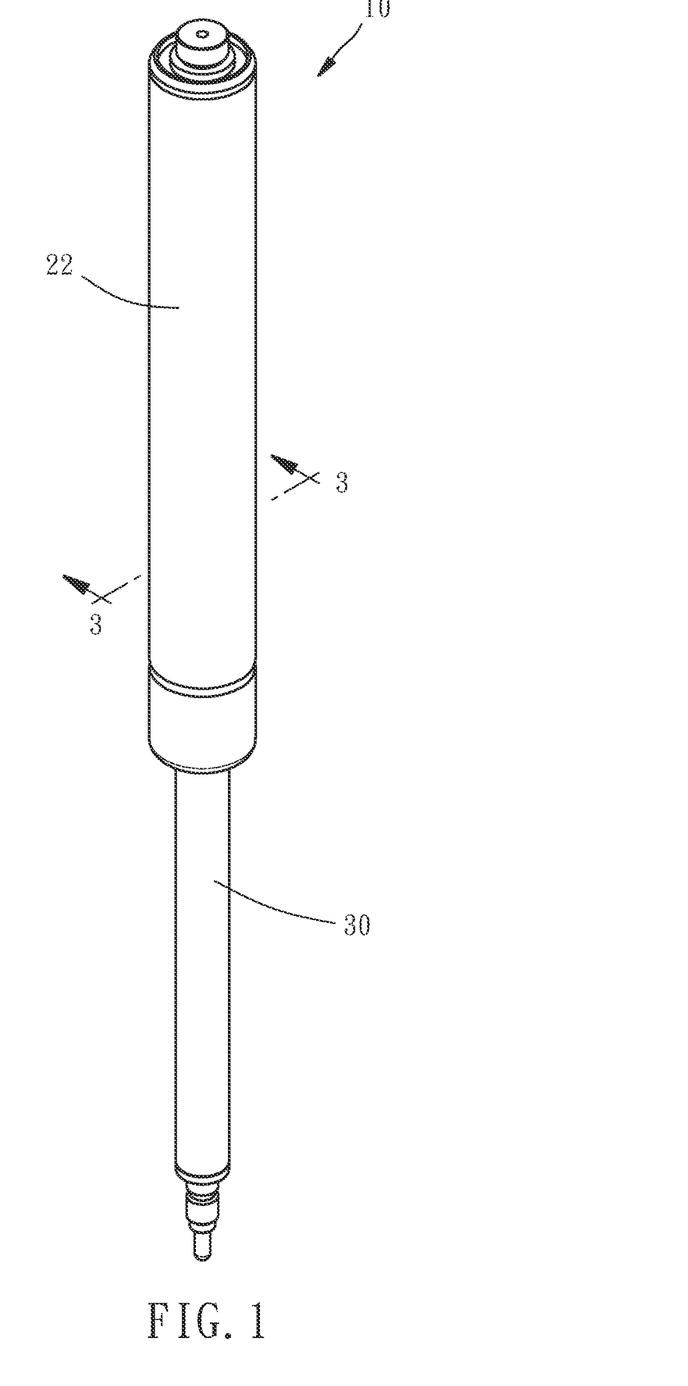
FIG. 1 is a perspective view of a pneumatic hydraulic retractable device of a first embodiment of the present invention.
Figure 2:
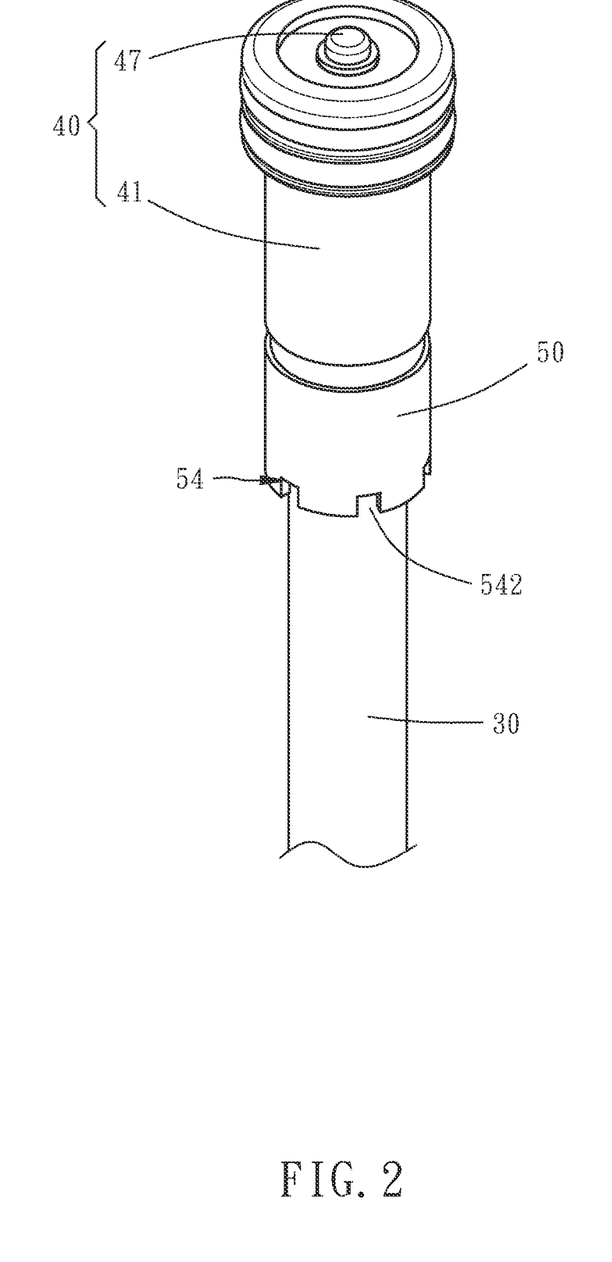
FIG. 2 is a partially perspective view of the pneumatic hydraulic retractable device of the first embodiment of the present invention, in which the fluid pressure cylinder is omitted.
Figure 3:
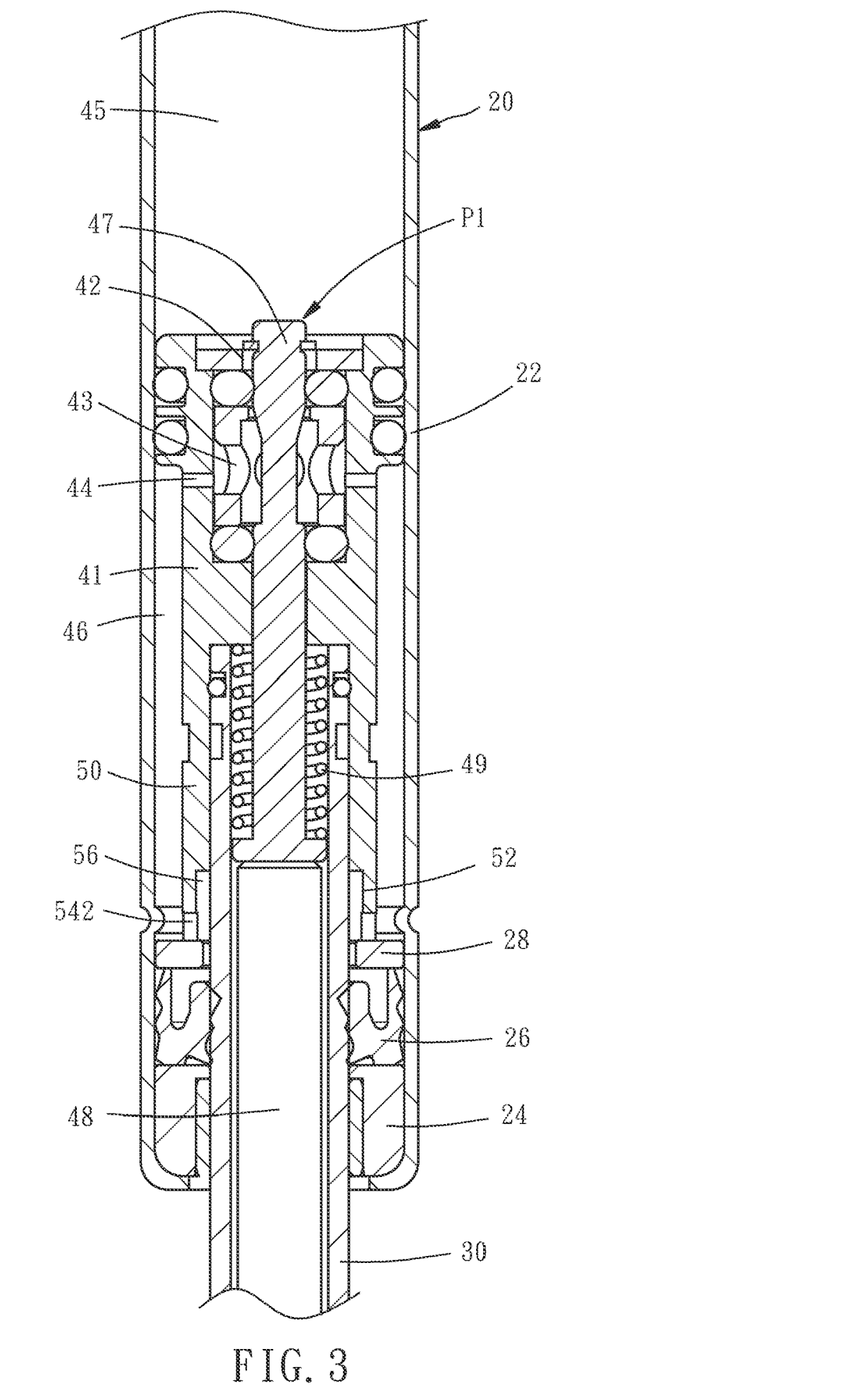
FIG. 3 is a sectional view taken along line 3-3 of FIG. 1, showing that the valve rod is located at the close position.

Referring to FIGS. 1 to 3, a pneumatic hydraulic retractable device 10 of a first embodiment of the present invention comprises a fluid pressure cylinder 20, a piston rod 30, a control valve set 40, and a pressure relief element 50.

The fluid pressure cylinder 20 includes a cylinder body 22, an end block 24 fixed to one end of the cylinder body 22, a buffer member 26 abutted against one end of the end block 24, and a plug seat 28 abutted against the other end of the buffer member 26.

The piston rod 30 is movably disposed in the fluid pressure cylinder 20.

Figure 4:
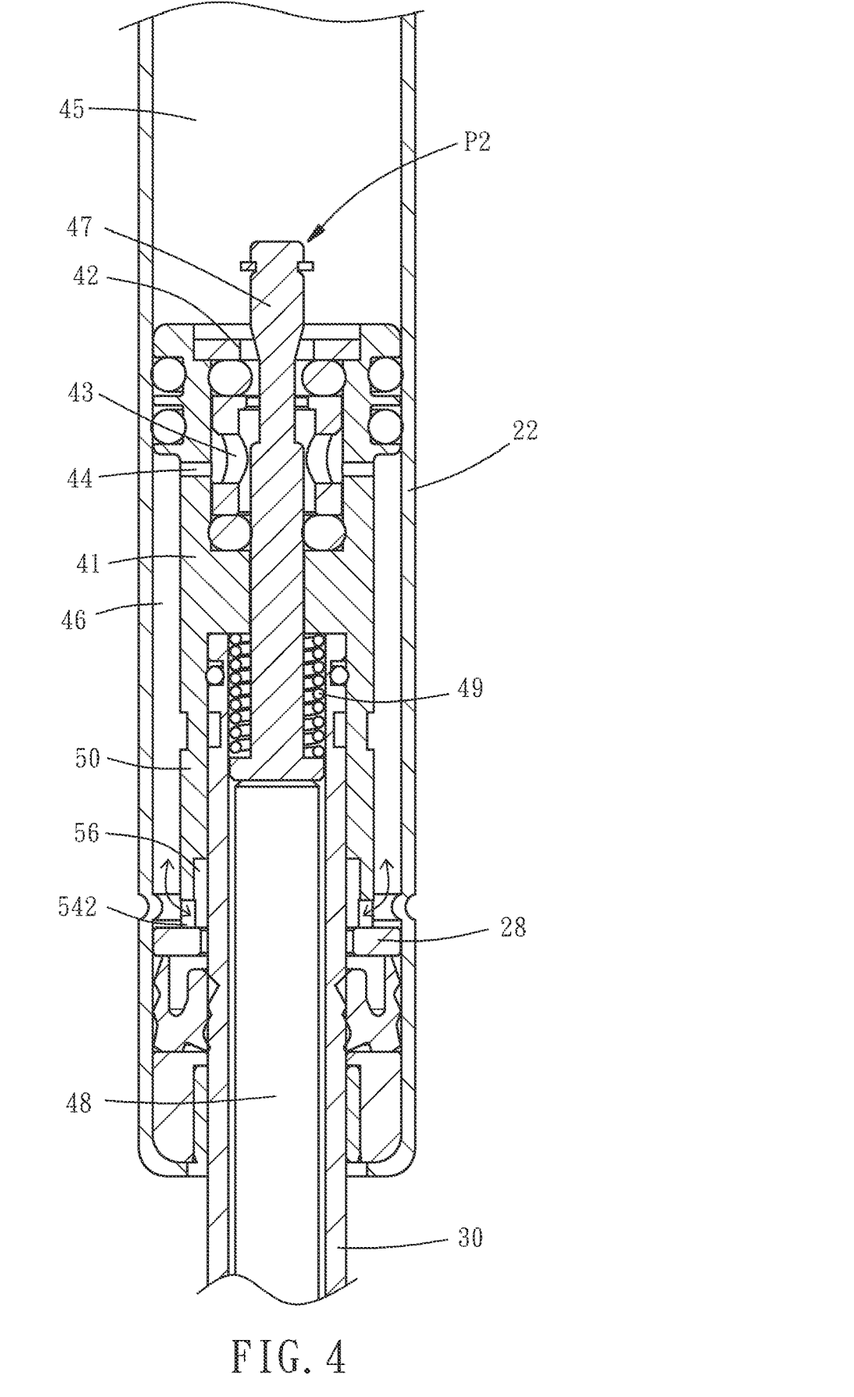
FIG. 4 is similar to FIG. 3, showing that the valve rod is located at the open position.

The control valve set 40 includes a valve seat 41 and a valve rod 47. The valve seat 41 is disposed in the cylinder body 22 and connected to one end of the piston rod 30, such that the valve seat 41 can be moved together with the piston rod 30, and the valve seat 41 and the cylinder body 22 form an upper fluid chamber 45 and a lower fluid chamber 46. In addition, the valve seat 41 includes a valve hole 42 communicating with the upper fluid chamber 45, a plurality of inner radial holes 43 communicating with the valve hole 42, and a plurality of outer radial holes 44 communicating with the inner radial holes 43 and the lower fluid chamber 46. The valve rod 47 is disposed in the valve hole 42 of the valve seat 41 and has a bottom end thereof abutted against a push rod 48 located in the piston rod 30. When the valve rod 47 is not pushed by the push rod 48, the valve rod 47 is held in a close position P1 as shown in FIG. 3 by a compression spring 49, such that the upper and lower fluid chambers 45, 46 do not communicate with each other. When the valve rod 47 is pushed by the push rod 48 to move to an open position P2 as shown in FIG. 4, the upper and lower fluid chambers 45, 46 communicate with each other through the valve holes 42, the inner radial holes 43, and the outer radial holes 44.

The pressure relief element 50 is disposed between the valve seat 41 and the plug seat 28 and penetrated by the piston rod 30. In this embodiment, the pressure relief element 50 extends integrally from one end of the valve seat 41 towards the plug seat 28. As shown in FIG. 3, the bottom end of the pressure relief element 50 has an annular groove 52. The diameter of the annular groove 52 is greater than the diameter of the piston rod 30 so as to form a pressure relief gap 56 between the annular groove 52 and the piston rod 30. In addition, the bottom end of the pressure relief element 50 has a communication portion 54. The pressure relief gap 56 communicates with the lower fluid chamber 46 through the communication portion 54. In this embodiment, the communication portion 54 is formed by a plurality of notches 542 arranged in an equally-spaced manner around the annular groove 52.

It can be seen from the above that when the valve rod 47 is located at the open position P2 as shown in 4, the upper and lower fluid chambers 45, 46 communicate with other, such that fluid (such as hydraulic oil or high pressure gas) flows between the upper and lower fluid chambers 45, 46. At this time, the fluid is allowed by the communication portion 54 formed by the notches 542 to flow between the lower fluid chamber 46 and the pressure relief gap 56 (as shown by the arrow in FIG. 4) for reducing airtight effect generated between the pressure relief element 50 and the plug seat 28 when the pressure relief element 50 is abutted against the plug seat 28. On one hand, the piston rod 30 can be pressed by the rider conveniently, and on the other hand, the proper shock-absorbing effect can be exerted by the present invention.

Figure 5:
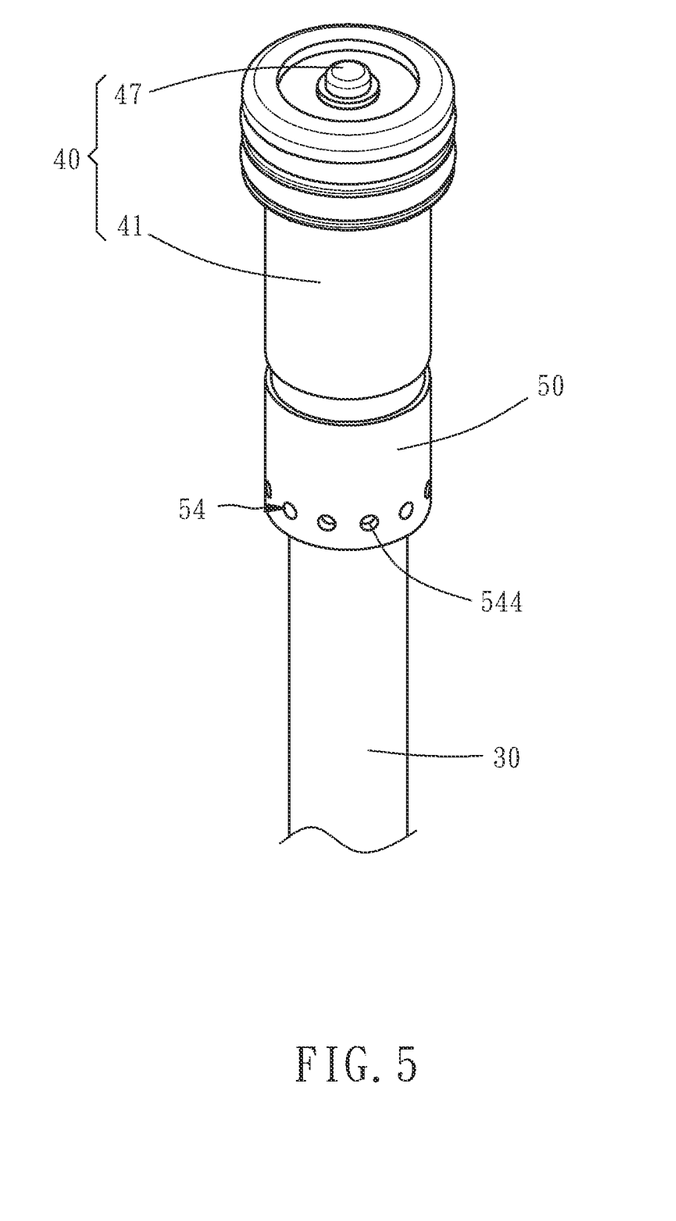
FIG. 5 is a partially perspective view of the pneumatic hydraulic retractable device of a second embodiment of the present invention, in which the fluid pressure cylinder is omitted.
Figure 6:
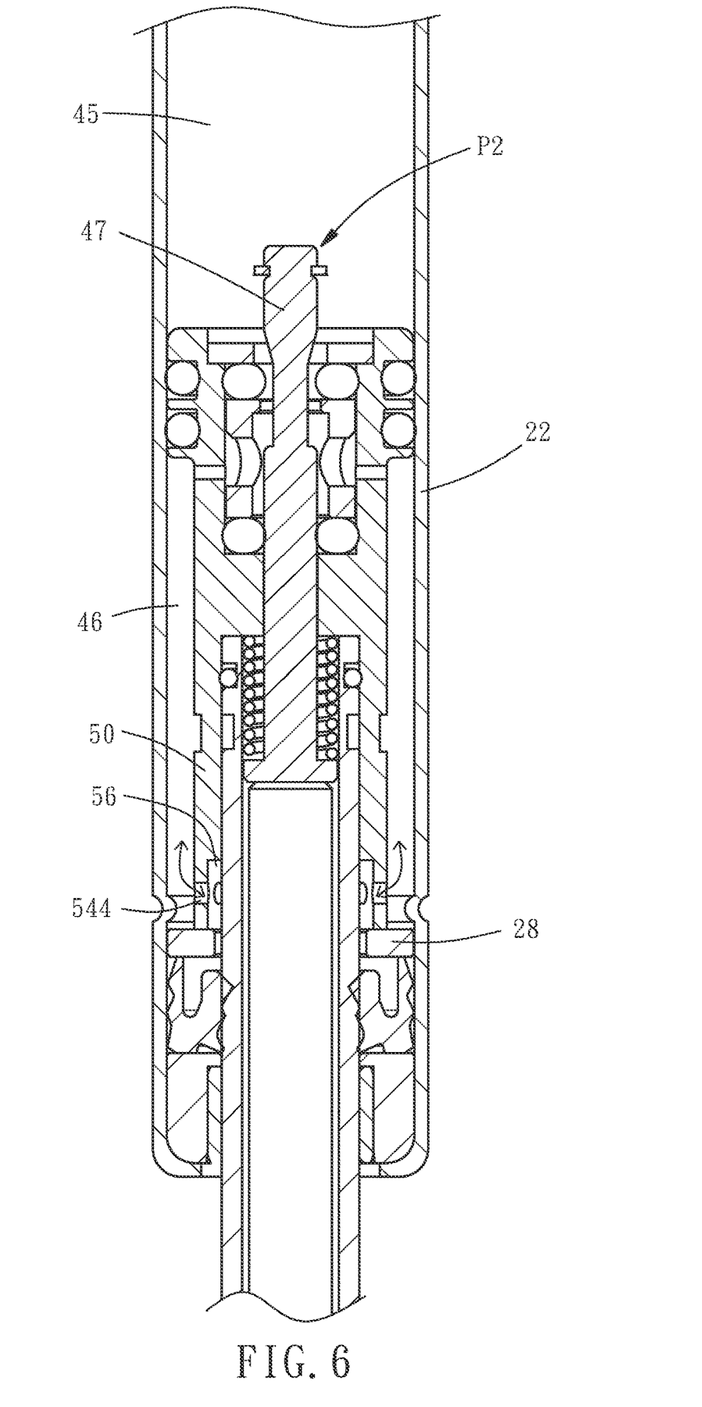
FIG. 6 is a sectional view of the pneumatic hydraulic retractable device of the second embodiment of the present invention.

What needs to be added here is that the communication portion 54 can be varied in structure. As shown in FIGS. 5 and 6, in the second embodiment of the present invention, the communication portion 54 is formed by a plurality of through holes 544 arranged in an equally-spaced manner around the annular groove 52. In this way, the fluid is allowed by the through holes 544 to flow between the lower fluid chamber 46 and the pressure relief gap 56 (as shown by the arrow in FIG. 6) for reducing the airtight effect generated between the pressure relief element 50 and the plug seat 28 when the pressure relief element 50 is abutted against the plug seat 28.

Figure 7:
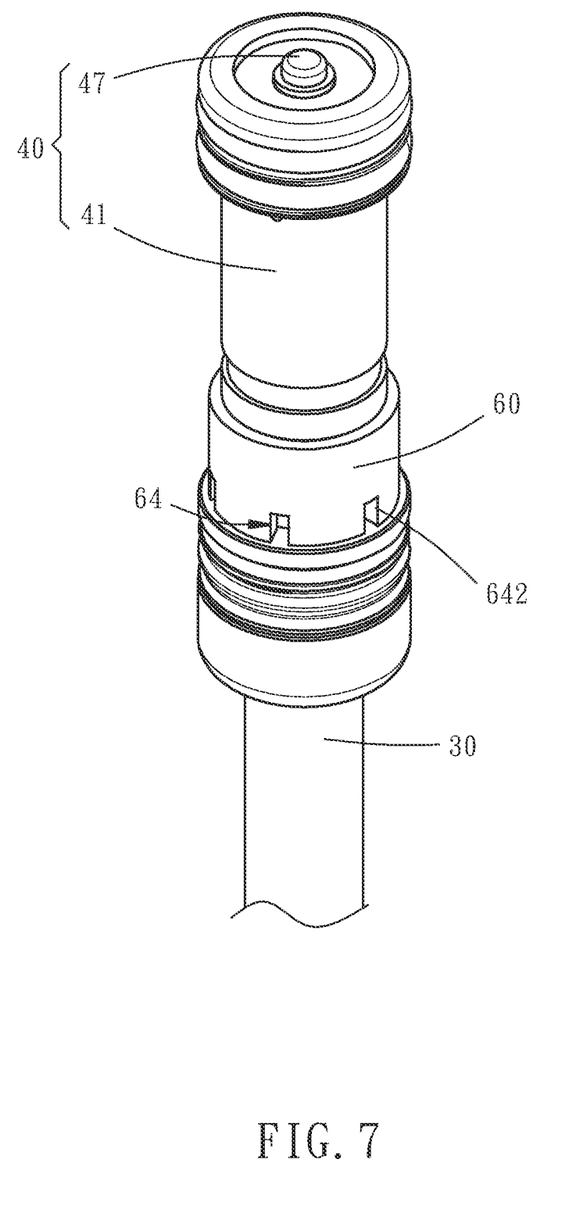
FIG. 7 is a partially perspective view of the pneumatic hydraulic retractable device of a third embodiment of the present invention, in which the fluid pressure cylinder is omitted.
Figure 8:
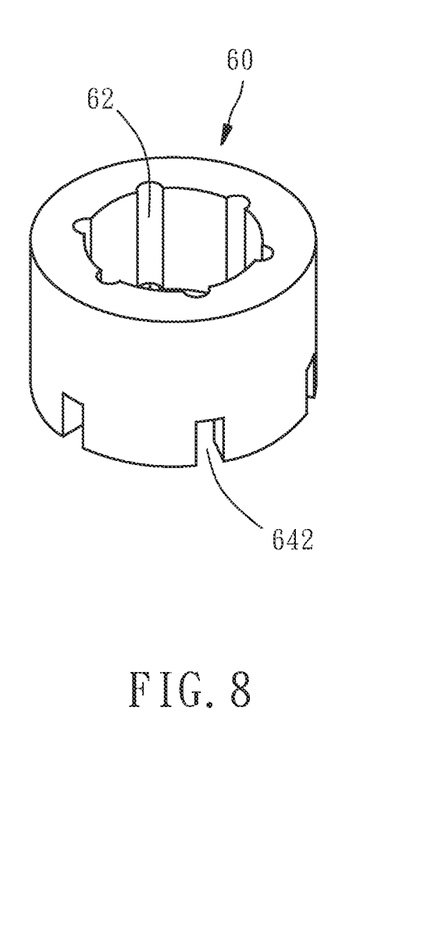
FIG. 8 is a perspective view of a pressure relief element provided by the pneumatic hydraulic retractable device of the third embodiment of the present invention.
Figure 9:
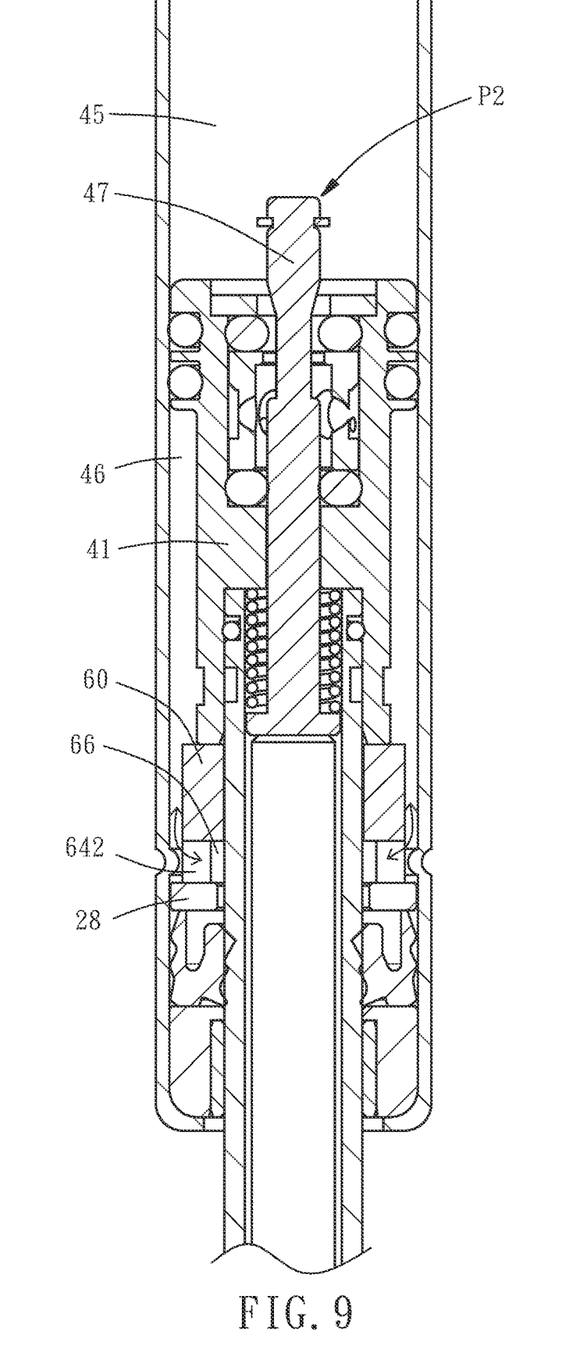
FIG. 9 is a sectional view of the pneumatic hydraulic retractable device of the third embodiment of the present invention.

On the other hand, in the third embodiment of the present invention, the pressure relief element 60 is not connected with the valve seat 41. As shown in FIGS. 7 and 9, the top end of the pressure relief element 60 supports the bottom end of the valve seat 41, and the bottom end of the pressure relief element 60 is abutted against the plug seat 28. As shown in FIGS. 8 and 9, the inner surface of the pressure relief element 60 has a plurality of recesses 62 (the number is not limited as long as at least one is sufficient) arranged in an equally-spaced annular manner. The recesses 62 extend straight from the top end of the pressure relief element 60 to the bottom end of the pressure relief element 60, such that a pressure relief gap 66 is formed by the piston rod 30 and each of the recesses 62. In addition, the bottom end of the pressure relief element 60 has a communication portion 64. In this embodiment, the communication portion 64 is formed by a plurality of notches 642 arranged in an equally-spaced annular manner. In this way, when the valve rod 47 is located at the open position P2 as shown in FIG. 9, the upper and lower fluid chambers 45, 46 communicate with other, such that the fluid (such as hydraulic oil or high pressure gas) flows between the upper and lower fluid chambers 45, 46. At this time, the fluid is allowed by the communication portion 64 formed by the notches 642 to flow between the lower fluid chamber 46 and the pressure relief gaps 66 (as shown by the arrow in FIG. 9) for achieving the purpose of reducing the airtight effect. On one hand, the piston rod 30 can be pressed by the rider conveniently, and on the other hand, the proper shock-absorbing effect can be exerted by the present invention.

Figure 10:
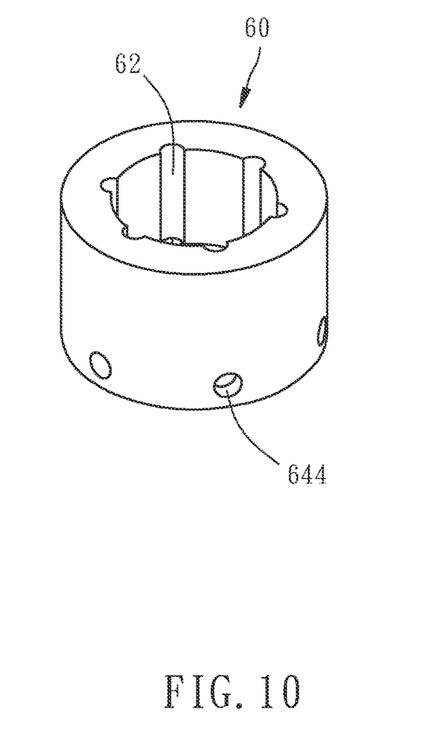
FIG. 10 is a perspective view of a pressure relief element provided by the pneumatic hydraulic retractable device of the fourth embodiment of the present invention.
Figure 11:
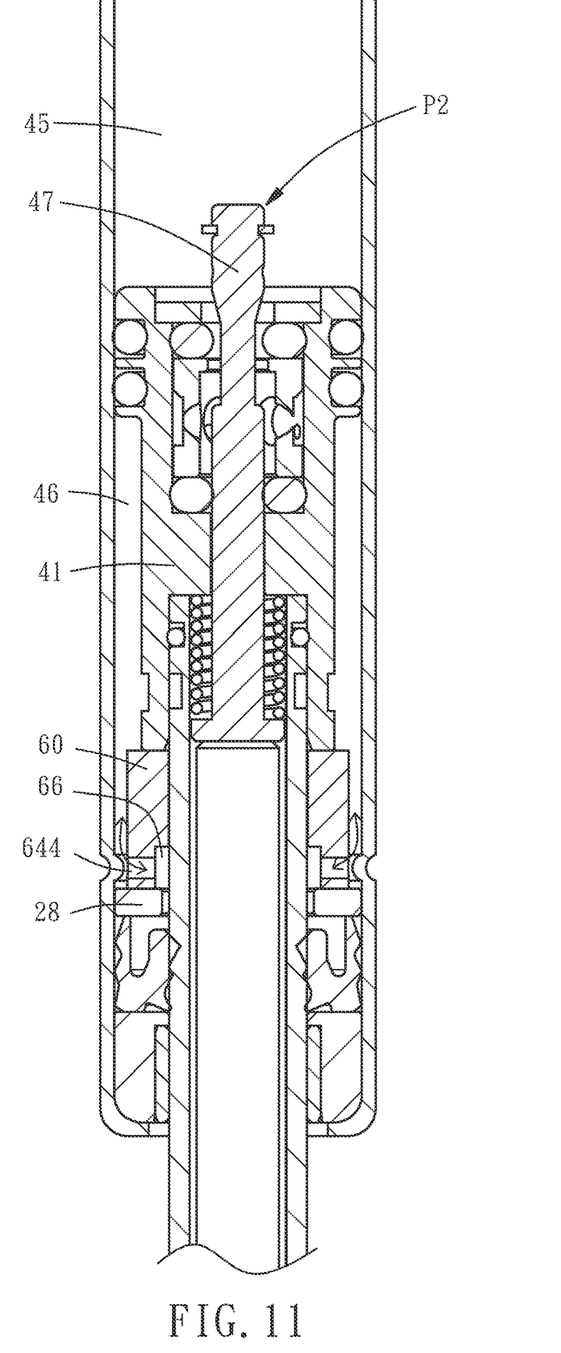
FIG. 11 is a sectional view of the pneumatic hydraulic retractable device of the fourth embodiment of the present invention.

What needs to be added here is that the communication portion 64 can be varied in structure. As shown in FIGS. 10 and 11, in the fourth embodiment of the present invention, the communication portion 64 is formed by a plurality of through holes 644 arranged in an equally-spaced annular manner. In this way, the fluid is allowed by the through holes 644 to flow between the lower fluid chamber 46 and the pressure relief gap 66 (as shown by the arrow in FIG. 11) for achieving the purpose of reducing the airtight effect.

What is claimed is:

1. A pneumatic hydraulic retractable device comprising:
   a fluid pressure cylinder having a cylinder body and a plug seat disposed in the cylinder body and located at one end of the cylinder body;
   a piston rod movably disposed in the fluid pressure cylinder;
   a control valve set including a valve seat disposed at one end of the piston rod and forming an upper fluid chamber and a lower fluid chamber with the cylinder body therebetween, and a valve rod disposed in the valve seat and moved between a close position where the upper and lower fluid chambers do not communicate with each other and an open position where the upper and lower fluid chambers communicate with each other; and
   a pressure relief element disposed between the valve seat and the plug seat and penetrated by the piston rod and having a communication portion, one end of the pressure relief element and the piston rod forming a pressure relief gap therebetween communicating with the lower fluid chamber through the communication portion.

2. The pneumatic hydraulic retractable device as claimed in claim 1, wherein the pressure relief element extends integrally from one end of the valve seat towards the plug seat.

3. The pneumatic hydraulic retractable device as claimed in claim 2, wherein one end of the pressure relief element has an annular groove; a diameter of the annular groove is greater than a diameter of the piston rod so as to form the pressure relief gap between the annular groove and the piston rod.

4. The pneumatic hydraulic retractable device as claimed in claim 1, wherein the pressure relief element has one end supporting one end of the valve seat and the other end abutted against the plug seat.

5. The pneumatic hydraulic retractable device as claimed in claim 4, wherein an inner surface of the pressure relief element has a recess forming the pressure relief gap with the piston rod.

6. The pneumatic hydraulic retractable device as claimed in claim 1, wherein the communication portion is formed by a plurality of notches arranged in an equally-spaced annular manner.

7. The pneumatic hydraulic retractable device as claimed in claim 1, wherein the communication portion is formed by a plurality of through holes arranged in an equally-spaced annular manner.

\* \* \* \* \*